July 28, 1925.
W. KUTALEK
1,547,500
FORMER FOR PLASTIC MOLDING
Filed July 31, 1923
FIG. 1.
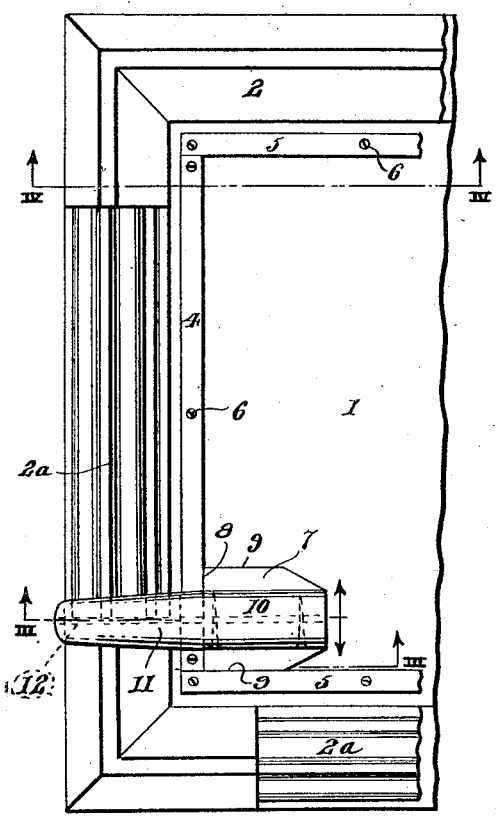
FIG. 2.
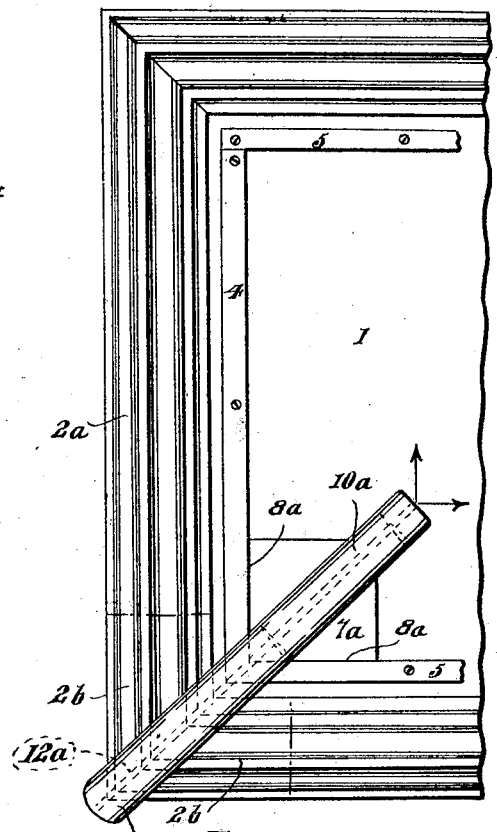
FIG. 3.
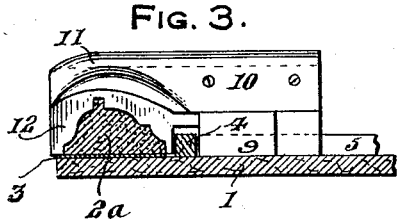
FIG. 5.
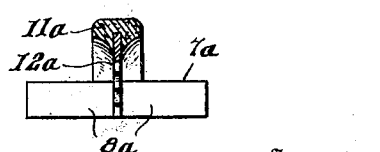
FIG. 4.
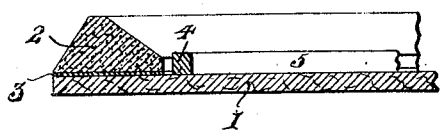
FIG. 6.
Inventor
William Kutalek
By F. K. Bryant
Attorney Patented July 28, 1925.

1,547,500

UNITED STATES PATENT OFFICE.

WILLIAM KUTALEK, OF AUSTIN, TEXAS.

FORMER FOR PLASTIC MOLDING.

Application filed July 31, 1923. Serial No. 654,949.

*To all whom it may concern:*

Be it known that I, WILLIAM KUTALEK, a citizen of the United States of America, residing at Austin, in the county of Travis and State of Texas, have invented certain new and useful Improvements in Formers for Plastic Molding, of which the following is a specification.

This invention relates to certain new and useful improvements in formers for plastic molding of either wall or picture frame type and has particular reference to the provision of a mold former or cutting tool for cutting a blank molding strip of plastic material into a grooved or ridged molding configuration.

A further object of the invention is to provide a former for plastic molding of a picture frame type wherein a molding blank of rectangular formation supported upon a base board has a guide frame associated with the blank and with which frame a former or cutting member carried by a block having a plurality of straight edges cooperate with the cutting member having its longitudinal axis disposed at an angle to the straight edges of the block to permit the cutting member to move over the mold blank in forming a corner thereof.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Fig. 1 is a fragmentary top plan view showing a partially formed plastic picture frame molding and base support therefor with a former for cutting the molding blank at the side portions thereof spaced from the corners, Fig. 2 is a fragmentary top plan view, similar to Fig. 1 showing the type of former for cutting the corners of the frame molding, Fig. 3 is a detail sectional view taken on line III—III of Fig. 1 showing the former cooperating with a guide strip carried by the base support for the frame molding, Fig. 4 is a detail sectional view taken on line IV—IV of Fig. 1 showing the molding blank, Fig. 5 is a side elevational view of the mold former shown in Fig. 2, and Fig. 6 is a detail sectional view taken on line VI—VI of Fig. 5.

Referring more in detail to the accompanying drawing, a picture frame molding of plastic material in blank form is mounted upon a base board 1 adjacent the edges thereof, the blank molding 2 being spaced from the base board 1 by the strip 3 that prevents ready removal of the finished molding. The base board 1 and molding blank 2 are of rectangular formation, the base board 1 carrying a rectangular guide frame upon the upper face thereof inwardly of the molding blank 2 formed of side strips 4 and end strips 5 anchored to the base board as at 6.

To form the mold configuration $2^a$ in the sides and ends of the molding blank 2, the type of former illustrated in Figs. 1 and 3 is employed, the block 7 having a forward straight edge 8 and parallel side edges 9 being fixed to the upper face thereof, a longitudinally extending arm 10 projecting laterally thereof as at 11 with a depending or cutting blade 12 carried by the arm projection 11 with the inner edge of the cutting blade 12 spaced from the straight edge 8 of the block 7. The block 7 is flatly placed upon the base board 1 with the forward straight edge 8 thereof engaging the guide strips 4 or 5 with the cutting blade 12 overlying the molding blank 2. By reciprocating the block 7 the blade 12 cuts the desired mold configuration $2^a$ as shown in Figs. 1 and 3, movement of the block 7 being limited by the opposite edges 9 thereof engaging the guide strips 4 or 5 according to the position of the block.

In forming the mold configuration $2^b$ at the angle corners of the molding blank 2, the type of former illustrated in Figs. 2, 5, and 6 is employed, the rectangular block $7^a$ having a pair of straight edges $8^a$ with the arm $10^a$ diagonally secured to the upper face of the block $7^a$ with the longitudinal axis thereof extending at an angle to the straight edges $8^a$. The arm $10^a$ carries an end extension $11^a$ having a depending cutting blade $12^a$ that is of greater length than the cutting blade 12 to compensate for the angle position thereof during use. The block $7^a$ is flatly placed upon the base board 1 with the straight edges $8^a$ moving over the guide strips 4 and 5, while the cutting blade $12^a$ moving over the corners of the molding blank 2 forms the molding configuration 2ᵇ. It will therefore be seen that by the angular disposition of the blade carrying arm 10ᵃ with respect to the supporting block 7ᵃ, the angle corners of the molding blank 2 are cut into the molding configuration similar to the side sections 2ᵃ. After the formation of the molding, the same may be readily removed from the base board 1 by disengaging the strip 3 from the board providing a completed rectangular frame molding.

While there is herein shown and described the preferred embodiment of the present invention, it is nevertheless to be understood that minor changes may be made therein without departing from the spirit and scope of the invention as claimed.

What is claimed is:—

1. A former for plastic molding comprising a block having a straight edge, an arm secured to one face of the block and projecting laterally thereof, and a mold forming blade depending from the projecting end of the arm.

2. A former for plastic molding comprising a block having a straight edge, an arm secured to one face of the block and projecting laterally thereof, and a mold forming blade depending from the projecting end of the arm and terminating at its lower edge substantially in the same plane with the lower face of the block.

3. A former for plastic molding comprising a block having a plurality of straight edges, an arm secured to one face of the block and projecting laterally thereof, and a mold forming blade depending from the projecting end of the arm.

4. A former for plastic molding comprising a block having a plurality of straight edges, an arm secured to one face of the block and projecting laterally thereof, and a mold forming blade depending from the projecting end of the arm and terminating at its lower edge substantially in the same plane with the lower face of the block.

5. A former for plastic molding comprising a block having a plurality of straight edges, an arm secured to one face of the block and projecting laterally thereof with the longitudinal axis of the arm disposed at an angle to the straight edges, and a mold forming blade depending from the projecting end of the arm.

6. A former for plastic molding comprising a block having a plurality of straight edges, an arm secured to one face of the block and projecting laterally thereof with the longitudinal axis of the arm disposed at an angle to the straight edges, and a mold forming blade depending from the projecting end of the arm and terminating at its lower edge substantially in the same plane with the lower face of the block.

7. Means for forming a picture frame molding comprising a base board adapted to hold a molding blank, a guide strip mounted on the base board, and a former including a cutting blade moving over the molding blank and a supporting block for the cutting blade having a plurality of straight edges and moving in engagement with the guide strip.

8. Means for forming a picture frame molding comprising a base board adapted to hold a molding blank, a guide strip mounted on the base board, a former including a cutting blade moving over the molding blank and a supporting block for the cutting blade moving in engagement with the guide strip, the supporting block being rectangular and having a pair of straight edges with the cutting blade extending at an angle to the straight edges.

9. A molding device for picture frames comprising a flat base board, a series of guide strips spaced from the periphery of the edges of the base board and extending parallel thereto, whereby space is left on the base board exterior of the guide strips for the reception of plastic material to be molded, and an arm over hanging said exterior space and movable in guided relation therealong by engagement with a guide strip, and a forming blade depending from said over hanging portion of the arm.

10. A molding device for picture frames comprising a flat base board, a series of guide strips spaced from the periphery of the edges of the base board and extending parallel thereto, whereby space is left on the base board exterior of the guide strips for the reception of plastic material to be molded, and an arm over hanging said exterior space and movable in guided relation there along by engagement with a guide strip, a forming blade depending from said over hanging portion of the arm, said arm being arranged at forty-five degrees to the guide strips.

In testimony whereof I affix my signature.

WILLIAM KUTALEK.